July 11, 1950 — F. X. LAMB — 2,515,014

ELECTRICAL MEASURING INSTRUMENT

Filed May 8, 1946

Inventor:
Francis X. Lamb.

By Pierce & Scheffler,
Attorneys.

Patented July 11, 1950

2,515,014

UNITED STATES PATENT OFFICE 2,515,014

ELECTRICAL MEASURING INSTRUMENT

Francis X. Lamb, East Orange, N. J., assignor to Weston Electrical Instrument Corporation, Newark, N. J., a corporation of New Jersey Application May 8, 1946, Serial No. 668,172

5 Claims. (Cl. 171—95)

This invention relates to electrical measuring instruments and more particularly to long scale measuring instruments which may be manufactured, when desired, in substantially smaller sizes than has been possible with the prior types of long scale instruments.

The conventional instruments of the permanent magnet-pivoted coil type have a scale length of about 90°, and the prior permanent magnet constructions for extending the scale to an angular length of the order of up to 200° to 270° have been relatively complex, expensive and of large size. It is advantageous for various reasons to manufacture electrical measuring instruments in small or "miniature" sizes that may be housed in casings having an outside diameter of, for example, about 1.5 inches. The scale length for an instrument of conventional design and of such small size would be about 0.7 inch, and the scale graduations would be so crowded as to preclude an accurate reading of the measured value. The design requirements for prior instruments of the long scale type are such that it is not possible to manufacture the known instruments in such small size as to fit within a casing having a diameter of the order of 1.5 inches.

An object of the present invention is to provide miniature electrical measuring instruments having scales of long angular and linear extent. An object is to provide miniature instruments having a scale length in excess of the diameter of the instrument casing. More specifically, an object is to provide electrical measuring instruments of the pivoted coil type in which the length of the instrument scale is substantially greater than the outside diameter of the instrument casing. A further specific object is to provide a single air gap type of permanent magnet-pivoted coil instrument in which the magnetic field system includes a cylindrical, radially charged permanent magnet having a circumferential length approximating the angular length of the instrument scale and a cylindrical soft iron yoke about the permanent magnet, the moving coil of the instrument being pivotally mounted for rotation about the axis of the magnet.

These and other objects and advantages of the invention will be apparent from the following specification when taken with the accompanying drawing in which.

Figure 1:
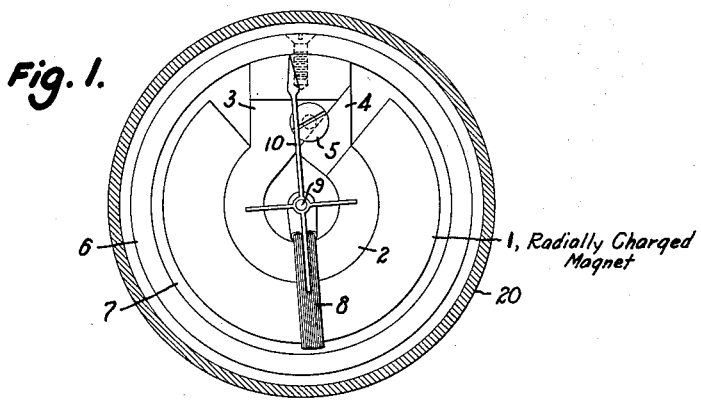
Fig. 1 is a somewhat schematic view of the permanent magnet and moving coil systems of an electrical measuring instrument embodying the invention; the parts being shown within the instrument casing and the moving coil being at approximately its mid-position.
Figures 2, 3:
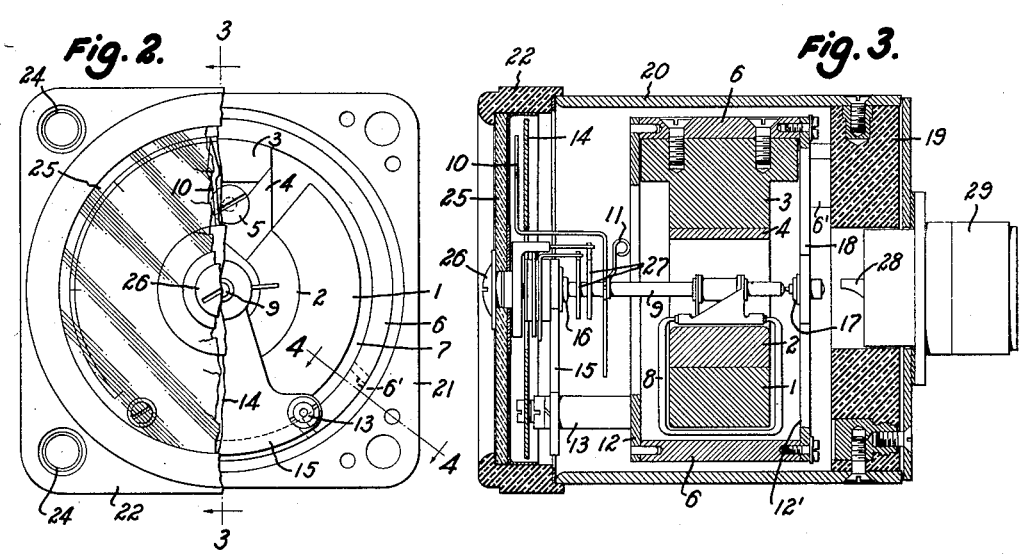
Fig. 2 is a front elevation of the instrument, with parts broken away from the right side of the view to show the casing shell and the instrument proper in elevation.
Fig. 3 is a vertical section through the instrument on substantially the plane indicated by line 3—3 of Fig. 2.
Figure 4:
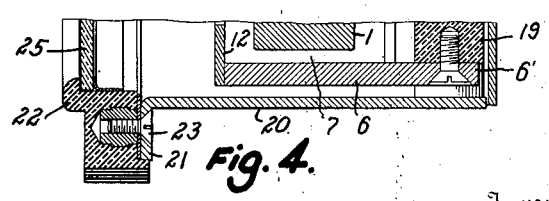
Fig. 4 is a fragmentary section on the plane indicated by line 4—4 of Fig. 2.

In the drawings, the reference numeral 1 identifies a radially charged magnet of generally annular form, but of incomplete or C-shape with a circumferential length of somewhat more than the desired angular length of the instrument scale. An inner flux collector of soft iron is secured to and in magnetic contact with the inner surface of the magnet 1; the flux collector being in two parts, one of hook shape and comprising an incomplete annulus 2 fitted within the magnet 1 and terminating in a base section 3, and the other part being a fillet or wedge 4 that is secured to the base 3 by a screw 5 to fill the gap between the base 3 and the outer end of the hook 2. An outer ring or cylinder 6 of soft iron surrounds and is spaced radially from the magnet 1 to provide an air gap 7, and the base 3 of the inner flux collector is connected mechanically and magnetically to the outer ring 6 to provide a low reluctance path for the magnetic flux.

The moving system of the instrument comprises a coil 8 supported eccentrically of a staff 9 which carries a pointer 10 and a counterweight 11 for the coil, the axis of the staff 9 coinciding or substantially coinciding with the axis of the magnet 1. The coil 8 is of the usual rectangular form and it surrounds the magnet 1 and ring section 2 of the inner flux collector, the outer side of the coil being within the air gap 7 and the inner side being within the substantially flux-free interior of the ring section 2. It will be apparent that the ring section 2 of the inner flux collector must have a circumferential length of less than 360° to permit assembly of the coil 8 about the magnet 1. The wedge 4 is necessary to obtain a uniformly graduated or linear scale as it provides a uniform flux density along the air gap 7, but the wedge 4 may be omitted when graduations are to be compressed at one end of the scale. The illustrated geometrical design of the fixed and removable portions of the inner flux collector is the presently preferred construction but it will be apparent that other geometrical designs of these complementary parts may be employed.

The instrument is of the single air gap type as the torque is determined substantially exclusively by the outer side of the coil 8 and the flux distribution along the air gap 7. Some leakage flux may be cut by the upper and lower ends of the coil 8 but, in general, this leakage flux is of negligible magnitude.

Annular plates 12, 12' are secured to the ends of the soft iron ring 6, the plates being preferably of soft iron to constitute shields for the magnetic structure of the instrument. As the plates 12, 12' overlie the effective flux gap within which the movable coil 8 rotates, it is apparent that the deflection characteristics of the instrument may be varied or controlled by proper shaping of the plates and their position with respect to the magnet 1 and the soft-iron ring 6. Posts 13 are secured to and project from the annulus 12 to support the scale plate 14 and a bridge 15 in which a bearing 16 for the staff 9 is mounted. The outer staff bearing 17 is mounted in a strap 18 which is integral with and extends diagonally across the annulus 12'.

The described instrument assembly is mounted upon the insulating base 19 of the casing by extensions 6' of the outer soft iron ring, and the assembly is housed within the cylindrical casing shell 20 which is also secured to the base 19. The illustrated instrument is of the panel mounting type and the casing shell has an outer flange 21 of rectangular form to which an outer collar 22 of the same outline is secured by screws 23. The projecting portions of the collar 22 have openings 24 for receiving the studs or bolts by which the instrument casing is mounted upon a panel. A cover glass 25 is fitted into the collar 22 and a zero correction system 26 is supported on the cover glass for adjustment of the outer end of one of the spiral springs 27 through which the coil 8 is connected to terminals 28 of a cable connector 29 which is secured to the insulating base 19.

Instruments embodying the invention may be manufactured in any desired size but the maximum advantages of the invention are obtained in miniature instruments which have long scales comparable to those of substantially larger instruments of conventional design. As instrument according to this invention and of 1.5 inches outside diameter with a 240° scale of 1.0 inch diameter may be read to the same accuracy as a conventional instrument with a 90° scale of about 2.75 inches diameter. The size of instruments embodying the invention may be reduced further by employing the outer ring 6 as the casing of the instrument. The illustrated instrument has a uniform scale characteristic as the inner face of the ring 6 and the outer face of the magnet 1 are coaxial but other scale characteristics may be had by shaping the inner surface of the ring 6 to obtain an air gap 7 of varying radial width or by an eccentric arrangement of the opposed cylindrical surfaces of magnet 1 and ring 6.

I claim:

1. An electrical instrument comprising a radially charged C-shaped magnet, means providing a magnetic material path for the flux of said magnet; said means including an inner flux collector in magnetic contact with the inner surface of the magnet and an outer flux collector ring spaced from the magnet by a radial gap, a coil having an inner side within said inner flux collector and an outer side in said radial gap, said inner flux collector being open at the circumferential gap of said magnet to permit assembly of said coil about said magnet, a magnetic material part for completing the full circumferential length of said inner flux collector after the assembly of the coil about the magnet, and means supporting said coil for rotational movement about substantially the axis of said magnet.

2. An electrical instrument comprising a radially charged C-shaped magnet, an inner flux collector in magnetic contact with the inner surface of the magnet and having a radial extension projecting outwardly through the circumferential gap of said magnet, an outer flux collector ring spaced from the magnet by a radial gap, a coil having an inner side within said inner flux collector and an outer side in said radial gap, and means supporting said coil for rotational movement about substantially the axis of said magnet, said collector ring being in magnetic contact with the radial extension of said inner flux collector.

3. An electrical instrument comprising a radially charged magnet of incomplete annulus form having a circumferential gap, means providing a magnetic material path for the flux of said magnet, said means including a soft iron flux collector ring within said magnet, a soft iron ring outside of and spaced radially from said magnet, a coil having an inner side within said flux collector ring and an outer side in the gap between said magnet and said outside ring, means supporting said coil for rotational movement, and a magnetic shield carried by said outside ring.

4. An electrical instrument comprising a radially charged magnet of incomplete annulus form having a circumferential gap, a soft iron flux collector ring within said magnet, a soft iron ring outside of and spaced radially from said magnet, means cooperating with said rings to complete a return path of low reluctance for the magnetic flux, a coil having an inner side within said flux collector ring and an outer side in the gap between said magnet and said outside ring, means supporting said coil for rotational movement, and a casing having a base and a shell, said ouside ring extending axially beyond said magnet and being supported on said base.

5. An electrical instrument comprising a radially charged magnet of incomplete annulus form having a circumferential gap, a soft iron flux collector ring within said magnet, a soft iron ring outside of and spaced radially from said magnet, said outside ring extending axially beyond said magnet, means cooperating with said rings to complete a return path of low reluctance for the magnetic flux, a coil having an inner side within said flux collector ring and an outer side in the gap between said magnet and said outside ring, and means supporting said coil for rotational movement, said coil-supporting means including a soft iron shield plate attached to said outside ring.

FRANCIS X. LAMB.

REFERENCES CITED

The following references are of record in the file of this patent:

UNITED STATES PATENTS

| Number | Name | Date |
| --- | --- | --- |
| 996,377 | Thompson et al. | June 27, 1911 |
| 1,985,082 | Faus | Dec. 18, 1934 |
| 2,272,767 | Corson et al. | Feb. 10, 1942 |
| 2,394,113 | Seaver et al. | Feb. 5, 1946 |
| 2,422,714 | Bigelow et al. | June 24, 1947 |